US012113429B1

United States Patent
Maru et al.

(10) Patent No.: US 12,113,429 B1
(45) Date of Patent: Oct. 8, 2024

(54) SMOOTH TRANSITION BETWEEN POWER MODES IN A POWER CONVERTER

(71) Applicant: Cirrus Logic International Semiconductor Ltd., Edinburgh (GB)

(72) Inventors: Siddharth Maru, Austin, TX (US); Bryan McCoy, Austin, TX (US); Chanchal Gupta, Chandler, AZ (US); Rosario Pagano, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 0 days.

(21) Appl. No.: 18/697,813

(22) PCT Filed: Mar. 10, 2023

(86) PCT No.: PCT/US2023/015006
§ 371 (c)(1),
(2) Date: Apr. 2, 2024

(87) PCT Pub. No.: WO2023/183150
PCT Pub. Date: Sep. 28, 2023

Related U.S. Application Data

(60) Provisional application No. 63/323,275, filed on Mar. 24, 2022.

(51) Int. Cl.
*H02M 1/00* (2007.01)
*H02M 3/156* (2006.01)
*H02M 3/158* (2006.01)

(52) U.S. Cl.
CPC ....... *H02M 1/0032* (2021.05); *H02M 3/1566* (2021.05); *H02M 3/158* (2013.01)

(58) Field of Classification Search
CPC ... H02M 1/0032; H02M 3/1566; H02M 3/158
See application file for complete search history.

(56) References Cited

U.S. PATENT DOCUMENTS

| | | | |
|---|---|---|---|
| 9,300,212 B2 * | 3/2016 | Notman | H02M 3/1588 |
| 10,715,039 B1 | 7/2020 | Ilango et al. | |
| 2014/0266122 A1 * | 9/2014 | Zhu | H02M 3/156 |
| | | | 323/284 |
| 2015/0137776 A1 | 5/2015 | Thomas et al. | |
| 2015/0326123 A1 | 11/2015 | Fukushima et al. | |
| 2016/0204704 A1 | 7/2016 | Cao | |

(Continued)

OTHER PUBLICATIONS

International Search Report and Written Opinion of the International Search Authority, International Application No. PCT/US2023/015006, mailed Jun. 9, 2023.

(Continued)

*Primary Examiner* — Rafael O De Leon Domenech
(74) *Attorney, Agent, or Firm* — Jackson Walker L.L.P.

(57) ABSTRACT

The controller for a system including a power converter may be configured to cause the system to operate in one of a low-power mode and the high-power mode based on power demand from a load at the output of the power converter and when in the low-power mode, monitor the output of the power converter to detect an occurrence of a load transient from the load and in response to detecting the occurrence of the load transient, transition from the low-power mode to the high-power mode via a transition mode to minimize undershoot and overshoot of the output voltage.

14 Claims, 8 Drawing Sheets

(56) References Cited

U.S. PATENT DOCUMENTS

2018/0062513 A1      3/2018   Arbetter
2018/0109186 A1      4/2018   Zhang et al.
2020/0212800 A1*     7/2020   Fan ..................... H02M 3/158
2022/0149737 A1*     5/2022   Yang ................... H02M 3/1582
2022/0337162 A1*    10/2022   Shen ................... H02M 3/156

OTHER PUBLICATIONS

Combined Search and Examination Report under Sections 17 and 18(3), UKIPO, Application No. GB2303659.3, mailed Sep. 14, 2023.

Chen, Wei-Chung et al., "A Wide Load Range and High Efficiency Switched-Capacitor DC-DC Converter with Pseudo-Clock Controlled Load-dependent Frequency", IEEE Transactions on Circuits and Systems I: Regular Papers, IEEE, US, vol. 61, No. 3, Mar. 1, 2014, pp. 911-921.

* cited by examiner

SMOOTH TRANSITION BETWEEN POWER MODES IN A POWER CONVERTER

RELATED APPLICATIONS

The present application is a 371 of International Patent Application No. PCT/US2023/015006, filed Mar. 10, 2023, which claims priority to U.S. Provisional Patent Application Ser. No. 63/323,275 filed Mar. 24, 2022, and claims priority to United Kingdom Application No. 2303659.3, filed Mar. 13, 2023, which also claims priority to U.S. Provisional Patent Application Ser. No. 63/323,275, each of which is incorporated by reference herein in its entirety.

FIELD OF DISCLOSURE

The present disclosure relates in general to circuits for electronic devices, including without limitation personal audio devices such as wireless telephones and media players, camera and image sensors, visual displays, and wireless communications devices, and more specifically, systems and methods for providing a smooth transition between a low-power mode and a high power mode in a power converter.

BACKGROUND

Electronic devices, including wireless telephones, such as mobile/cellular telephones, cordless telephones, mp3 players, cameras, and other electronic devices, are in widespread use. Such electronic devices may include circuitry for driving any suitable collection of electrical or electronic components, including without limitation speakers, headphones, motors, haptic actuators, image sensors, cameras, displays, wireless communications circuitry, etc. Oftentimes, a power converter may be used to provide a regulated supply voltage to a power amplifier in order to amplify a signal driven to speakers, headphones, motors, haptic actuators, or other components. A switching power converter is a type of electronic circuit that converts a source of power from one direct current (DC) voltage level to another DC voltage level. Examples of such switching DC-DC converters include but are not limited to a boost converter, a buck converter, a buck-boost converter, an inverting buck-boost converter, and other types of switching DC-DC converters. Thus, using a power converter, a DC voltage such as that provided by a battery may be converted to another DC voltage used to power the power amplifier or a sensor. In addition to a power amplifier or sensor, one or more other critical components of an electronic device may be powered from a stable power rail with a DC voltage regulated by a power converter.

A predominant portion of a DC-DC converter circuit may be implemented within a single power management integrated circuit (PMIC) that provides a regulated supply voltage for a plurality of components, which themselves may be implemented as one or more other integrated circuits. Many portable electronic devices may require a large number of converter circuits in order to generate multiple rail voltages. Portable electronic devices are usually battery operated and may need to be judicious in their use of power in order to ensure a battery maintains charge for as long as possible. Consequently, many of these PMICs and their converter circuits may need only be powered on in accordance with need. Thus, power converters may be off or in a lower power mode for a large portion of time, and turned on or activated only a short time prior to or exactly at the time the component needing the associated voltage supply rail is enabled.

For example, when a load of a DC-DC converter is off, the DC-DC converter may be operated in a lower power mode wherein the DC-DC converter only switches/operates as necessary to replenish charge on an output capacitor that establishes the supply rail. However, the load may become active at any time, generating a sudden current demand, also known as a load transient, from the DC-DC converter. In many instances, the DC-DC converter and its PMIC may have no prior indication of an impending activation of a load, and hence the DC-DC converter may need to respond quickly to any instantaneous reduction of the voltage on the output capacitor due to the applied load and transition to a higher power mode.

An example of a low-power mode may be a discontinuous conduction mode (DCM) or pulse-frequency modulation (PFM) mode of operation. In such a mode, a DC-DC converter may switch infrequently or on an as-needed basis to transfer charge to the converter's output capacitor. When operating in such a low-power mode, a significant portion of the digital and analog circuits supporting the DC-DC converter may be turned off to conserve power. When a sudden load is applied, the DC-DC converter may need to power on all supporting blocks and transition to a high-power mode to support the increased load demand. An example of a high-power mode may comprise a continuous conduction mode (CCM) or pulse-width modulation (PWM) mode of operation.

The finite time taken (e.g., due to the finite time needed to power on supporting blocks of the DC-DC power converter) to transition from a low-power state to a high-power state may cause a perturbation (e.g., voltage undershoot or voltage overshoot) on the supply rail at the output of the DC-DC power-converter. In many cases, it may be critical to limit these perturbations, as voltage undershoots and overshoots may negatively affect operation. Thus, transitions from low- to high-power states and vice versa may need to occur quickly. However, if transitions occur quickly but not smoothly, additional perturbation on the supply rail may occur. Accordingly, systems and methods for providing for smooth transitions between power modes may be desired.

SUMMARY

In accordance with the teachings of the present disclosure, one or more disadvantages and problems associated with existing approaches to regulating an output voltage of a power converter during transitions between power modes may be reduced or eliminated.

In accordance with embodiments of the present disclosure, a system may include a power converter for regulating an output voltage at an output of the power converter, power management circuitry configured to enable operation of the power converter, including one or more first components critical to operation of the power converter in a high-power mode and one or more second components critical to operation of the power converter in both the high-power mode and a low-power mode in which the system consumes significantly less power than that of the high-power mode, and a controller. The controller may be configured to cause the system to operate in one of the low-power mode and the high-power mode based on power demand from a load at the output of the power converter and when in the low-power mode, monitor the output of the power converter to detect an occurrence of a load transient from the load, wherein monitoring the output of the power converter comprises one of: monitoring for a condition in which the output voltage falls below a setpoint voltage of the system twice during a current period pulse of the power converter; and monitoring for a condition in which the output voltage falls below a setpoint voltage of the system for a predetermined duration of time during a current period pulse of the power converter, and in response to detecting the occurrence of the load transient, transition from the low-power mode to the high-power mode via a transition mode to minimize undershoot and overshoot of the output voltage.

In accordance with embodiments of the present disclosure, a method may be provided for a system having a power converter for regulating an output voltage at an output of the power converter and power management circuitry configured to enable operation of the power converter, including one or more first components critical to operation of the power converter in a high-power mode and one or more second components critical to operation of the power converter in both the high-power mode and a low-power mode in which the system consumes significantly less power than that of the high-power mode. The method may include causing the system to operate in one of the low-power mode and the high-power mode based on power demand from a load at the output of the power converter and when in the low-power mode, monitoring the output of the power converter to detect an occurrence of a load transient from the load, wherein monitoring the output of the power converter comprises one of: monitoring for a condition in which the output voltage falls below a setpoint voltage of the system twice during a current period pulse of the power converter; and monitoring for a condition in which the output voltage falls below a setpoint voltage of the system for a predetermined duration of time during a current period pulse of the power converter, and in response to detecting the occurrence of the load transient, transitioning from the low-power mode to the high-power mode via a transition mode to minimize undershoot and overshoot of the output voltage.

Technical advantages of the present disclosure may be readily apparent to one skilled in the art from the figures, description, and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
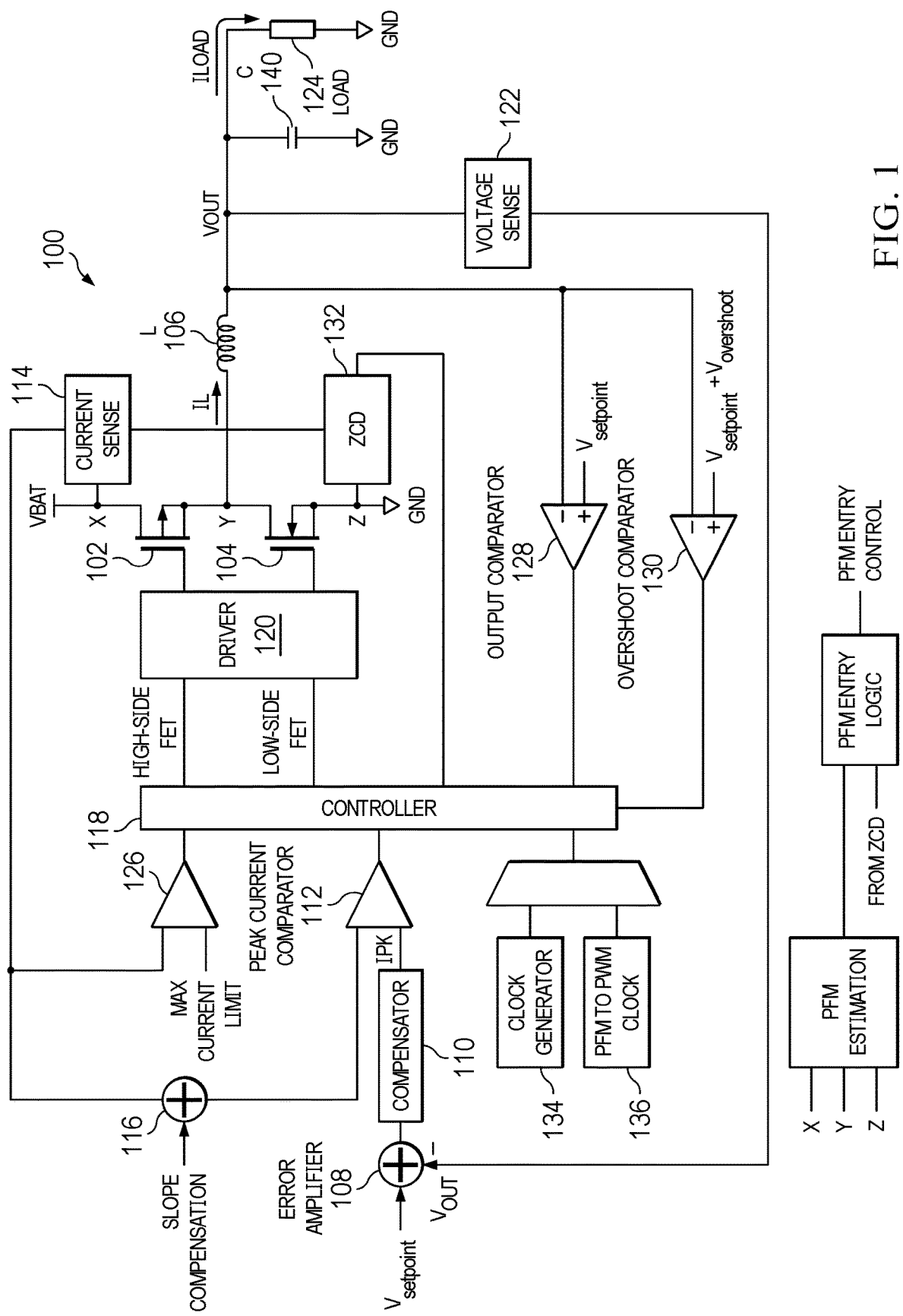
FIG. 1 illustrates selected components of an example power management system, in accordance with embodiments of the present disclosure.

FIG. 1 illustrates selected components of an example power management system 100, in accordance with embodiments of the present disclosure. Example power management system 100 depicted in FIG. 1 may be used in connection with any suitable electronic and/or electrical system, including without limitation smartphones, game controllers, portable media players, digital cameras, etc.

In particular, FIG. 1 illustrates a buck converter implemented by power switches 102 and 104 and power inductor 106, and various other components that may enable the buck converter to operate with a peak current control wherein switching of power switches 102 and 104 is based, at least in part, on comparison of inductor current through power inductor 106 and a peak current, wherein such peak current may vary in accordance with the closed loop control shown in FIG. 1. While FIG. 1 depicts a buck converter, the methods and systems described herein may also be applicable to other types of power converters, including without limitation boost converters, buck-boost converters, and others. In addition, while FIG. 1 depicts components associated with peak current control, the methods and systems described herein may also be applicable to other types of control modes for power converters, including duty cycle control mode and hysteretic control mode, provided that such control modes are operable between at least two modes comprising a high-power mode in which most or all components of a power management system are enabled and a low-power mode in which a significant portion of the components of a power management system are disabled.

In the embodiments represented by FIG. 1, power management system 100 may include an error amplifier 108 (shown as a combiner in FIG. 1) configured to amplify a difference between an error signal equal to the difference between a desired setpoint voltage $V_{setpoint}$ and an output voltage $V_{OUT}$ generated by the buck converter and sensed by voltage sensing circuitry 122. A compensator 110 may convert the error signal into a peak current value IPK, which may be compared by a peak current comparator 112 against an inductor current IL sensed by current sense circuitry 114 as modified by slope compensation circuitry 116. Based on the comparison of slope-compensated inductor current IL to peak current IPK, as well as other parameters, controller 118 may generate switching control signals for switch driver circuitry 120, which may in turn generate switching control signals for power switches 102 and 104 to regulate output voltage $V_{OUT}$ for use by load 124. Examples of such other parameters upon which controller 118 may control switching of power switches 102 and 104 include, without limitation:

- comparison of inductor current IL to a maximum current limit by a comparator 126;
- comparison of output voltage $V_{OUT}$ to setpoint voltage $V_{setpoint}$ by output comparator 128;
- comparison of output voltage $V_{OUT}$ to a sum of setpoint voltage $V_{setpoint}$ and an overshoot voltage $V_{overshoot}$ by overshoot comparator 130;
- any determinations of inductor current IL decreasing to zero as determined by zero crossing detector (ZCD) 132; and/or
- clock signals generated by clock generator 134 and/or PFM to PWM clock generator 136.

It is assumed that one of skill in the art is generally familiar with peak current control of a buck converter in either a high-power mode (e.g., CCM/PWM) or a low-power mode (e.g., DCM, PFM), including techniques involving zero crossing detection, slope compensation, maximum current limit control, etc. It is also assumed that one of skill in the art may be generally familiar with the fact that in a low-power mode, some components of power management system 100 may be disabled to save power. Examples of such disabled components may include error amplifier 108, compensator 110, voltage sensing circuitry 122, peak current comparator 112, slope compensation circuitry 116, output comparator 128, current sensing circuitry 114, clock generator 134, and/or overshoot comparator 130. Accordingly, discussion herein may be limited mainly to systems and methods employed by controller 118 to smoothly transition between these low-power and high-power modes and vice versa.

In the low-power mode, output comparator 128 may sense when output voltage $V_{OUT}$ drops below setpoint voltage $V_{setpoint}$, and controller 118 may respond to the drop by applying a fixed peak current to control power switches 102 and 104 to charge output capacitor 140 to return output voltage $V_{OUT}$ to the regulated voltage $V_{setpoint}$, and then controller 118 may cease switching of power switches 102 and 104 until output voltage $V_{OUT}$ again drops below setpoint voltage $V_{setpoint}$.

If a sudden load transient occurs in the low-power mode (e.g., load 124 goes from demanding little or no current to demanding a significant amount of current), sensing circuitry as well as circuitry that determines an amount of charge to transfer to output capacitor 140 may be disabled. Thus, a rapid transition from the low-power mode to the high-power mode may be needed to support the increased load demand. Such a transition may involve enabling components that were disabled in the low-power mode and gracefully transitioning from the low-power mode to the high-power mode while not pushing too much or too little charge to the output of the buck converter. If the transition from the low-power mode to the high-power mode is not graceful, a large voltage overshoot or undershoot may result, which could compromise proper operation of load 124.

In order to gracefully transition from the low-power mode to the high-power mode, it may first be necessary to detect a load transient that triggers the change from low-power mode to high-power mode. As described above, the tripping of output comparator 128 due to output voltage $V_{OUT}$ decreasing below setpoint voltage $V_{setpoint}$ causes controller 118 to control the buck converter to drive a fixed peak current pulse. In the absence of a load transient, such fixed peak current pulse may cause output voltage $V_{OUT}$ to increase above setpoint voltage $V_{setpoint}$, thus untripping output comparator 128. In the presence of a load transient, depending on the magnitude and the rate of the load transient, one of two possibilities may occur during a fixed peak current pulse of the low-power mode.

Figure 2A:
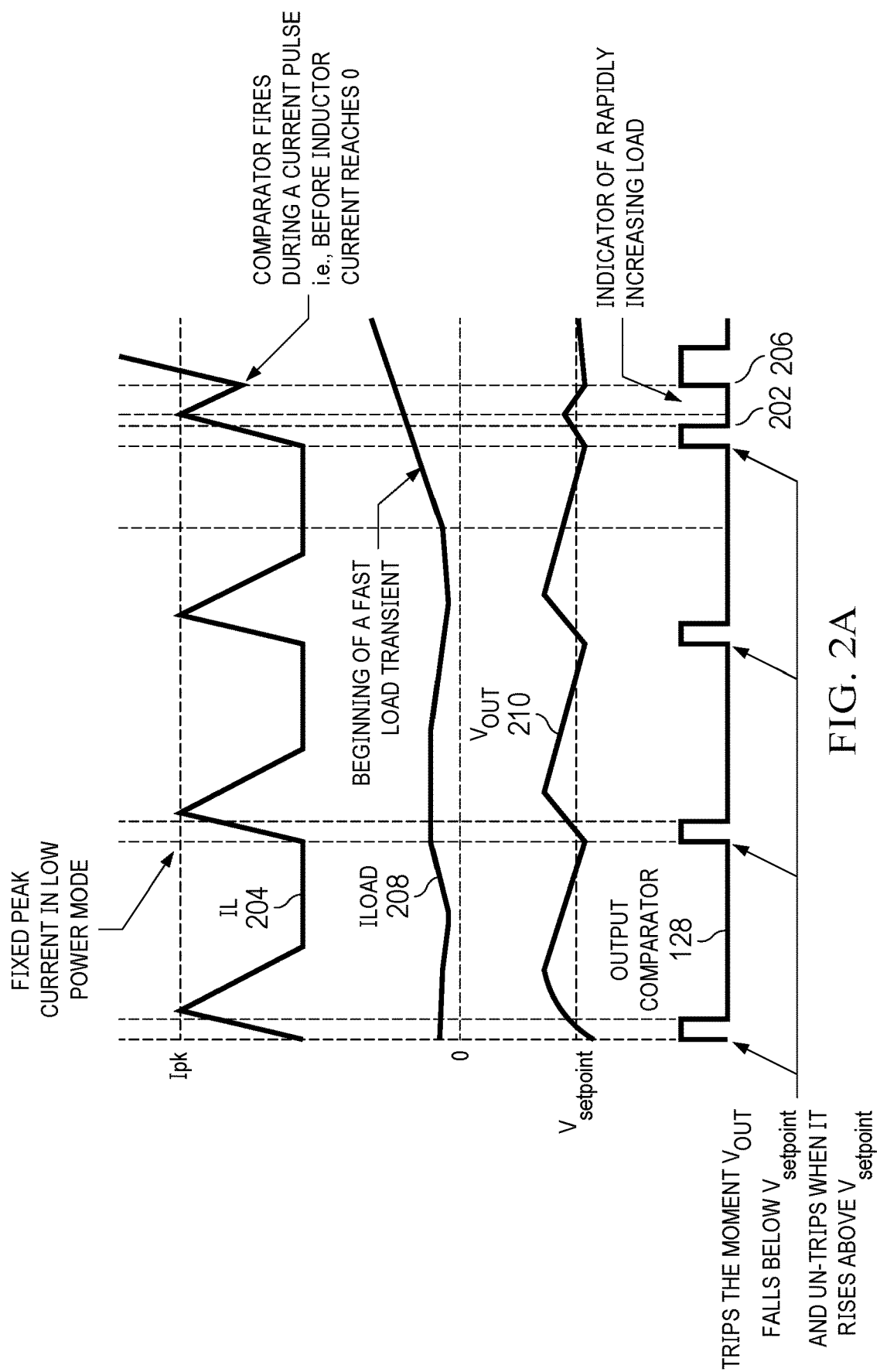
FIG. 2A illustrates selected waveforms of various signals that may be present in the power management system of FIG. 1 and used in detecting a load transient, in accordance with embodiments of the present disclosure.
Figure 2B:
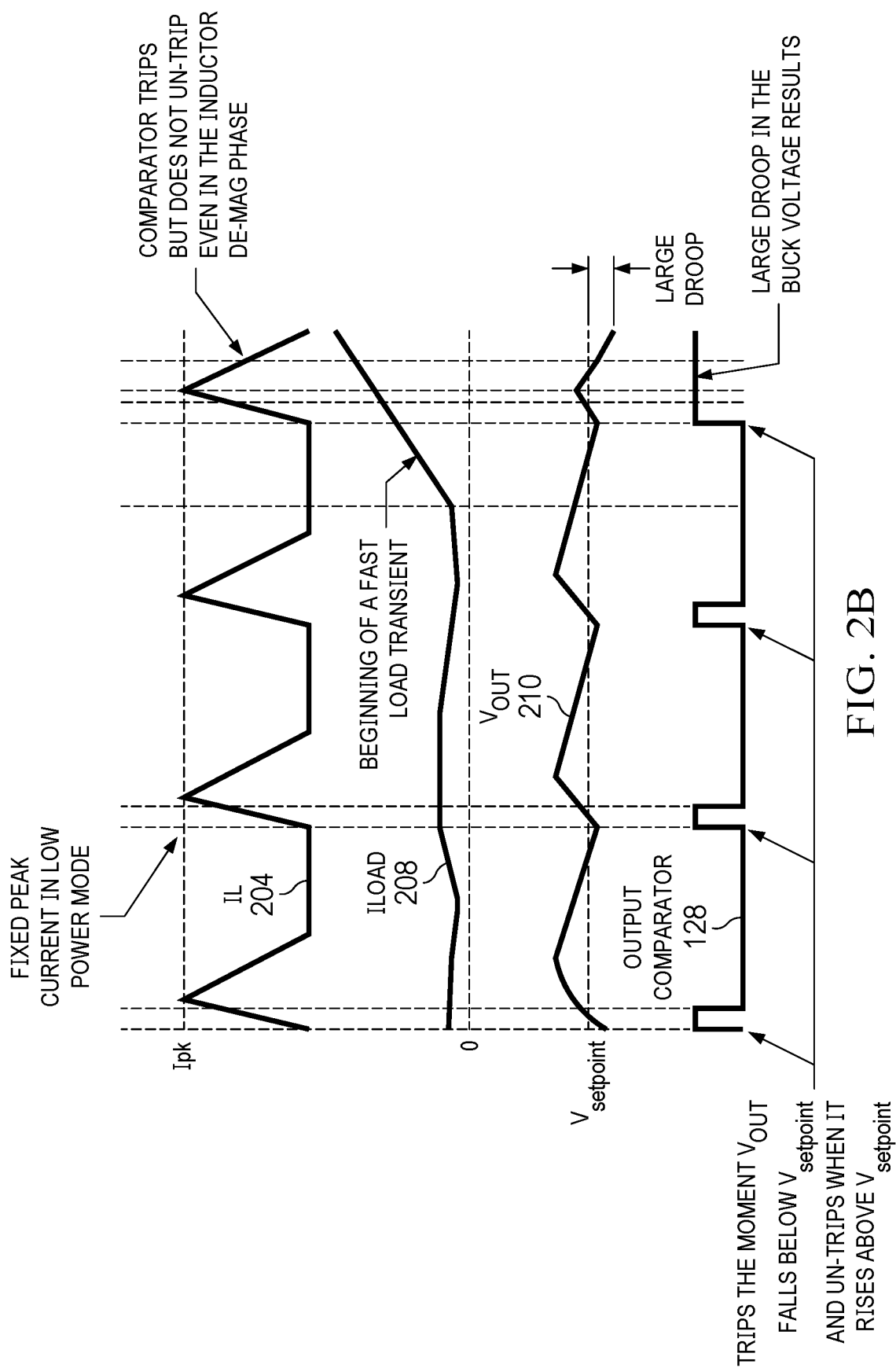
FIG. 2B illustrates selected waveforms of various signals that may be present in the power management system of FIG. 1 and used in detecting a load transient, in accordance with embodiments of the present disclosure.

The first possibility is shown in FIG. 2A, wherein output comparator 128 untrips at time 202 in response to a fixed peak current pulse 204, but trips again at time 206 before end of fixed peak current pulse 204 due to load transient 208. The second possibility is shown in FIG. 2B, wherein output comparator 128 fails to untrip for the entire duration of fixed current pulse 204 due to load transient 208. In either case, a load transient can be assumed to have occurred.

Figure 3:
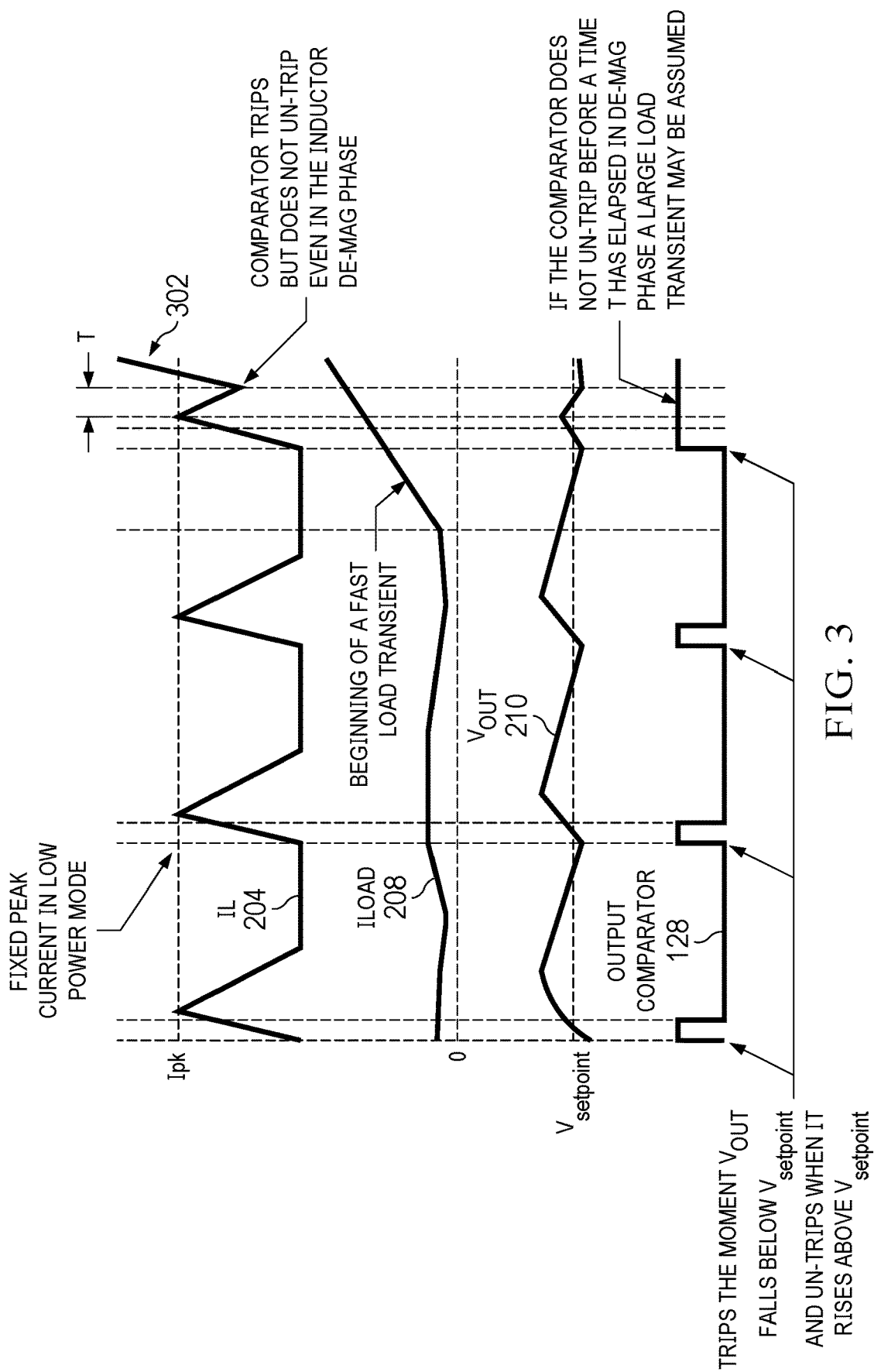
FIG. 3 also illustrates selected waveforms of various signals that may be present in the power management system of FIG. 1 and used in detecting a load transient, in accordance with embodiments of the present disclosure.

Controller 118 may be able to easily detect the first condition of FIG. 2A, given that output comparator 128 retrips while fixed peak current pulse 204 is being driven. The second condition of FIG. 2B may be harder to detect, as nothing may change with output comparator 128 during the entire fixed peak current pulse 204. If controller 118 waits until the end of the demagnetizing (or discharge) phase of fixed peak current pulse 204 (e.g., the portion of fixed peak current pulse 204 in which inductor current IL is decreasing) in order to determine whether a load transient has occurred, a significant voltage droop 210 to output voltage $V_{OUT}$ may occur. Accordingly, as shown in FIG. 3, controller 118 may wait for a pre-determined time T during the demagnetization phase of fixed peak current pulse 204 by which, if output comparator 128 has not tripped, controller 118 may assume a load transient has occurred and may take corrective action to transfer additional charge to output capacitor 140, as described in greater detail below.

Such pre-determined time T may be determined in any suitable manner. In some embodiments, controller 118 may determine pre-determined time T to be the time until which an amount of charge transferred to output capacitor 140 during fixed peak current pulse 204 is still increasing (which may be dependent upon an input voltage VBAT for the buck converter and output voltage $V_{OUT}$). After such time T, controller 118 may cause the start of a new pulse 302 to enter into a transition mode between the low-power mode and the high-power mode. Waiting until later than time T may significantly diminish the opportunity to transfer adequate charge leading to violation of droop requirements/specifications.

Figure 4:
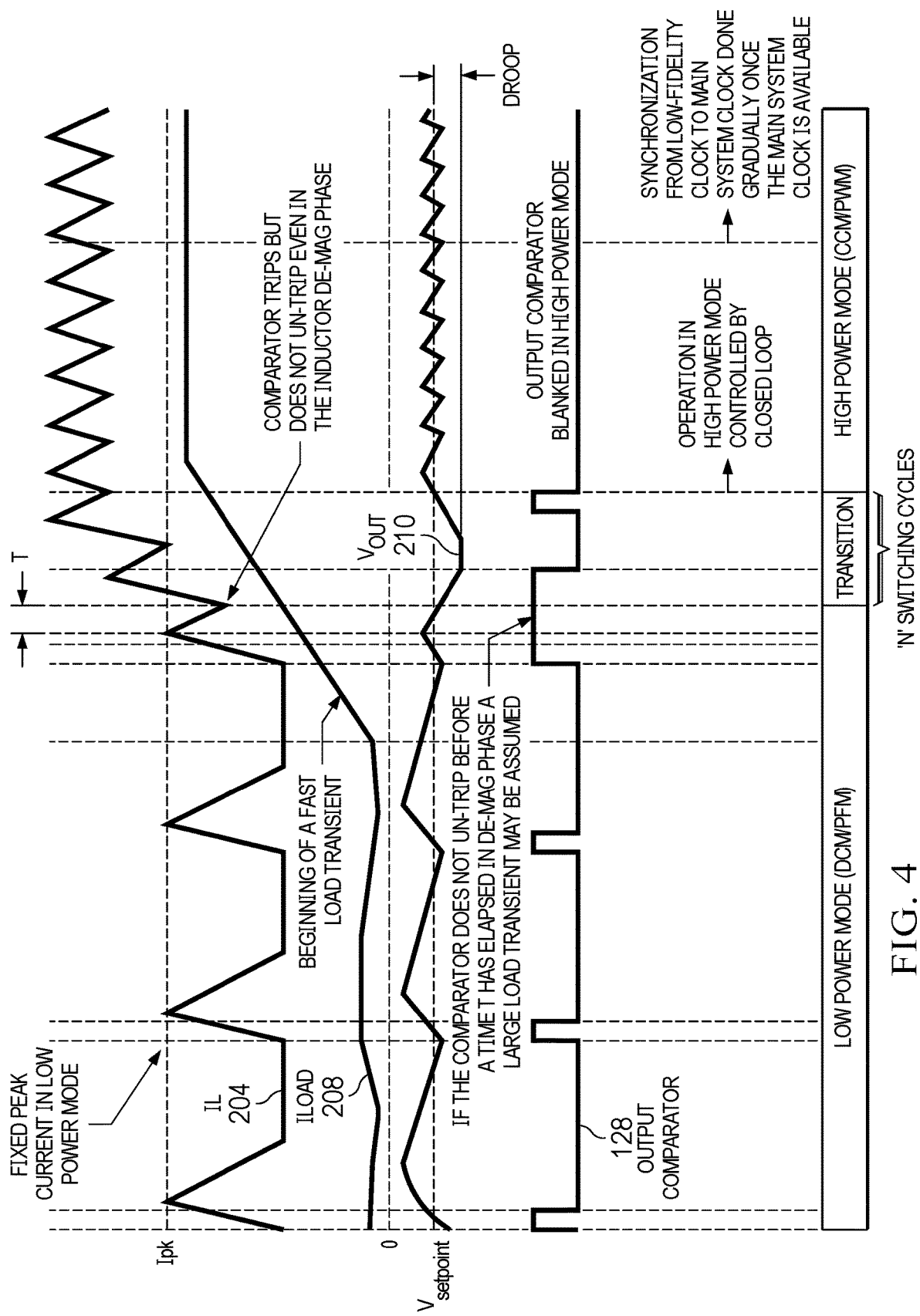
FIG. 4 illustrates selected waveforms of various signals that may be present in the power management system of FIG. 1 and used in detecting and responding to a load transient, in accordance with embodiments of the present disclosure.

FIG. 4 illustrates a general approach to responding to a detected load transient, detected by using any of the approaches disclosed above. As shown in FIG. 4, once a load transient has been detected during operation in the low-power mode, the buck regulator may switch from the low-power mode to a transition mode, in which the control scheme imposed by controller 118 is distinct from that of both the low-power and high-power modes. For example, unlike the low-power and high-power modes, during the transition mode, peak current IPK may be controlled in a feed-forward manner, on/off times of power switches 102 and 104 may be directly controlled, and/or frequency of operation may be controlled.

The length of the transition mode may be a predetermined number of switching cycles or a number of switching cycles determined based on one or more of: (a) a number of times output comparator 128 trips in a given time; (b) a duration of time between tripping and/or untripping of output comparator 128; (c) duration of time of a trip or untrip of output comparator 128; and/or (d) timing of a comparator trip relative to a switching cycle of the buck converter.

Because the main system clock (e.g., provided by clock generator 134) may be powered down during the low-power mode and may take time to power on, operations during the transition mode may be based on a low-fidelity clock (e.g., provided by PFM to PWM clock generator 136) generated for the transition mode. In some embodiments, a transition between the low-fidelity clock to the main system clock may be performed (e.g., by crossfading between the two clocks) to minimize clock discontinuity.

Figure 5A:
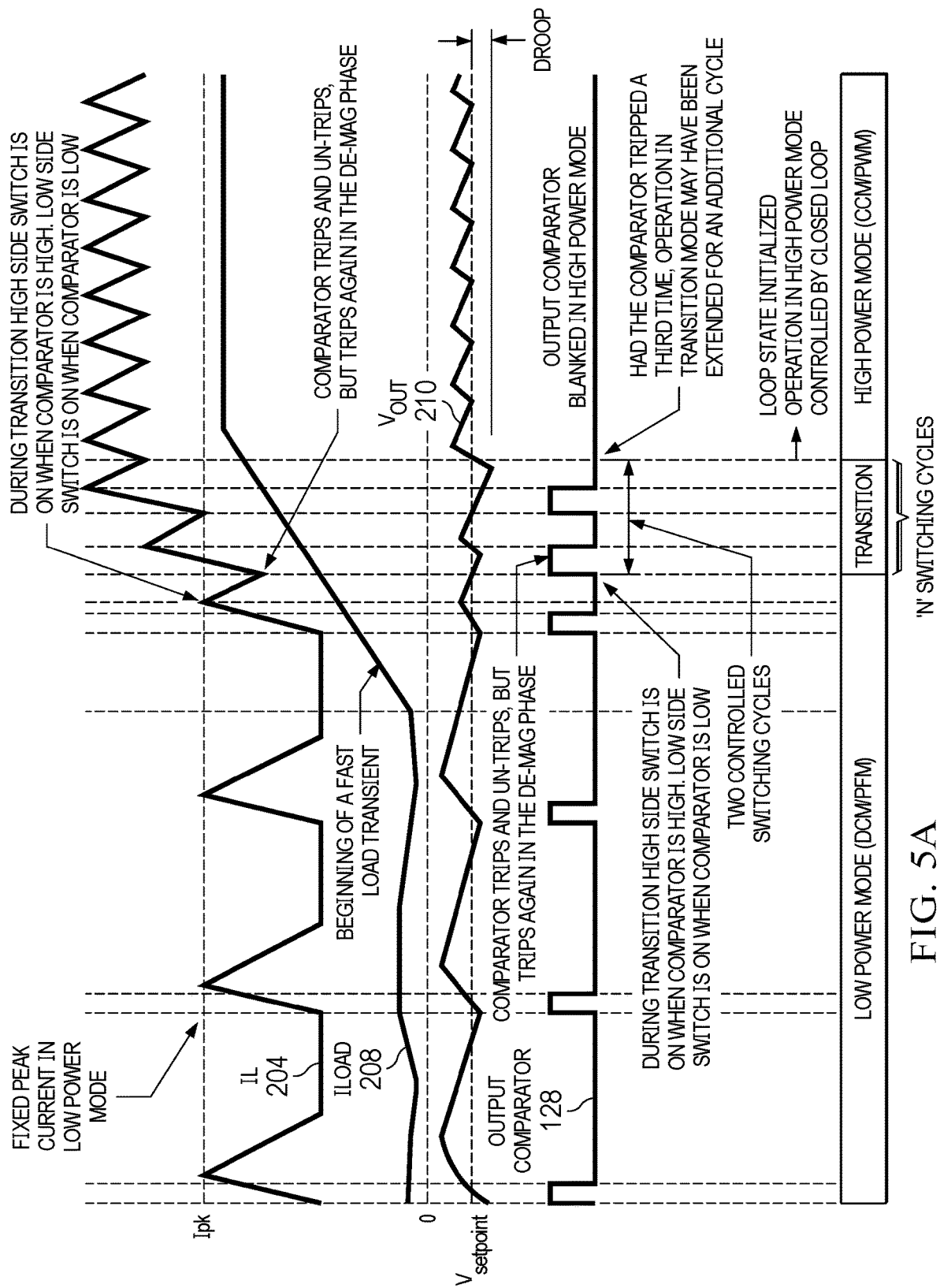
FIG. 5A illustrates selected waveforms of various signals that may be present in the power management system of FIG. 1 and used in detecting and responding to a load transient, in accordance with embodiments of the present disclosure.
Figure 5B:
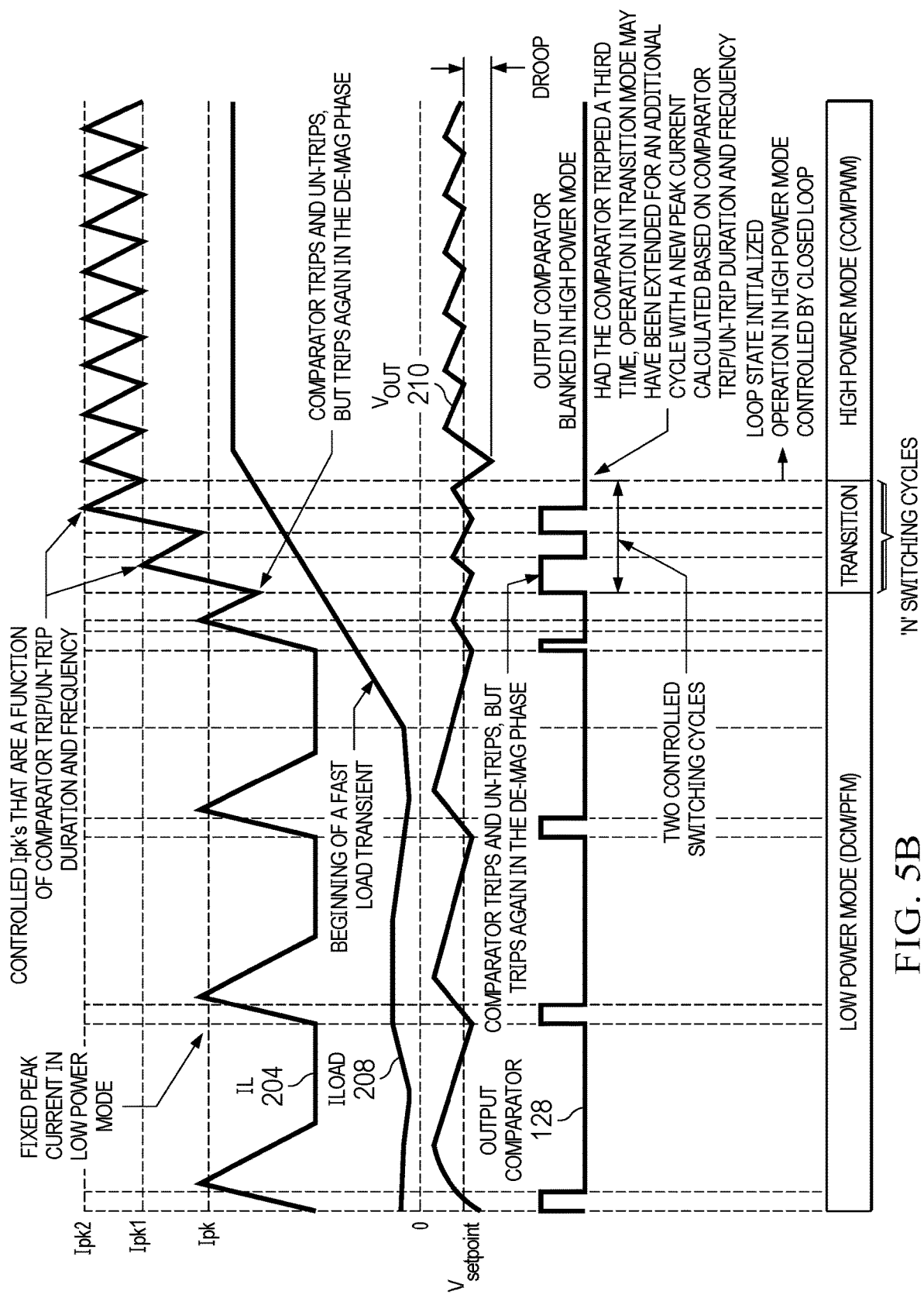
FIG. 5B illustrates selected waveforms of various signals that may be present in the power management system of FIG. 1 and used in detecting and responding to a load transient, in accordance with embodiments of the present disclosure.
Figure 5C:
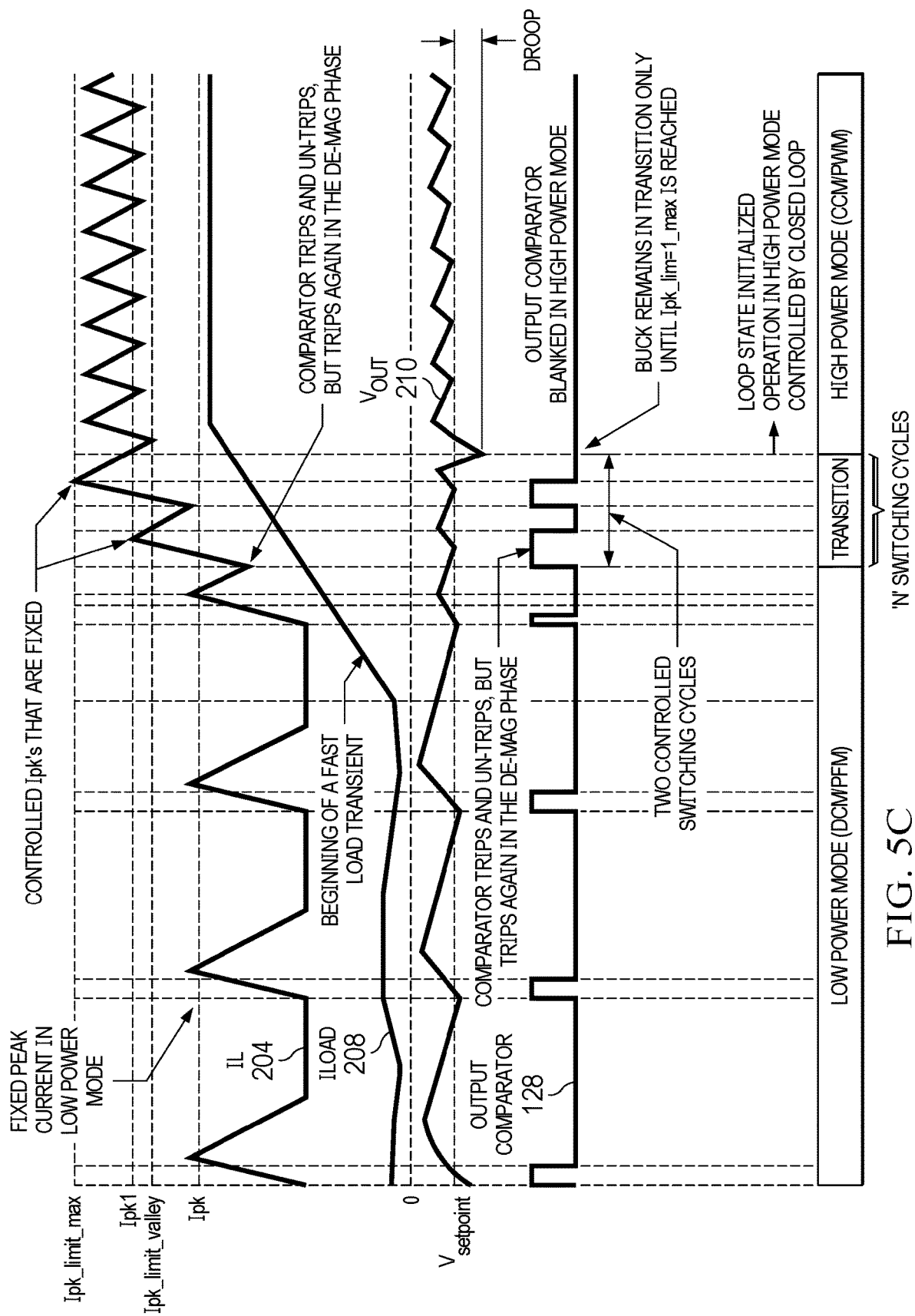
FIG. 5C illustrates selected waveforms of various signals that may be present in the power management system of FIG. 1 and used in detecting and responding to a load transient, in accordance with embodiments of the present disclosure.

Also during the transition mode, components of power management system 100 disabled during the low-power mode may be initialized and/or enabled so that they are ready to operate in the high-power mode at the end of the transition mode. Once the transition mode has ended, the closed loop control system of power management system 100 may control the regulation of output voltage $V_{OUT}$ during the high-power mode. FIGS. 5A-5C set forth example approaches to responding to a detected load transient.

In a first approach shown in FIG. 5A, the on/off times for power switches 102 and 104 of the buck converter during the transition phase may be controlled entirely based on the output of output comparator 128. For example, high-side power switch 102 may be enabled and low-side power switch 104 may be disabled when output comparator 128 is tripped, and high-side power switch 102 may be disabled and low-side power switch 104 may be enabled when output comparator 128 is untripped. Tying the on/off times of power switches 102 and 104 to output comparator 128 may ensure the amount of charge provided to output capacitor 140 is proportional to the demand of load 124. This manner of controlling the on/off times of power switches 102 and 104 may continue either for a pre-determined number of cycles (e.g., at least 1) or may be extended if additional instances of output comparator 128 tripping or failing to untrip are detected. If, at any stage, output comparator 128 has not tripped for a pre-determined amount of time or a certain number of switching cycles have elapsed, controller 118 may switch to the closed loop control of the high-power mode. When switching to the high-power mode, controller 118 may initialize state variables of the closed loop to values that are a function of the number, duration, and/or time separation between trips and untrips of output comparator 128.

In the second approach shown in FIG. 5B, peak current IPK during switching cycles of the transition mode may be controlled based on one or more of a duration between trips of output comparator 128, duration of time output comparator 128 is tripped, duration of time output comparator 128 is untripped, a difference between output voltage $V_{OUT}$ and setpoint voltage $V_{setpoint}$, and a fixed-predetermined value. Such peak current control may continue either for a fixed number of cycles (e.g., at least 1) or may be extended based on one or more of the parameters set forth in the previous sentence. Once the predetermined number of switching cycles has passed, controller 118 may switch to the closed loop control of the high-power mode. When switching to the high-power mode, controller 118 may initialize state variables of the closed loop to values that are a function of the number, duration, and/or time separation between trips and untrips of output comparator 128.

In the third approach shown in FIG. 5C, peak current IPK during switching cycles of the transition mode may be controlled based on a fixed value for a fixed number of cycles until a maximum current limit is reached. Thereafter, controller 118 allows peak current IPK to fall to a second lower limit, before switching the closed loop control in the high-power mode. In this third approach, voltage undershoot may be minimized by potentially causing a slight overshoot due to the peak current being increased until the maximum current limit is reached. When switching to the high-power mode, controller 118 may initialize state variables of the closed loop to values that are a function of the number, duration, and/or time separation between trips and untrips of output comparator 128.

In all three approaches, additional switching constraints such as minimum on and off times of power switches 102 and 104 may be imposed to control switching frequency or avoid arbitrarily small or large switch on and off times during the transition phase.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in FIG. 1s and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:
a power converter for regulating an output voltage at an output of the power converter;
power management circuitry configured to enable operation of the power converter, including one or more first components critical to operation of the power converter in a high-power mode and one or more second components critical to operation of the power converter in both the high-power mode and a low-power mode in which the system consumes significantly less power than that of the high-power mode; and
a controller configured to:
cause the system to operate in one of the low-power mode and the high-power mode based on power demand from a load at the output of the power converter; and
when in the low-power mode:
monitor the output of the power converter to detect an occurrence of a load transient from the load, wherein monitoring the output of the power converter comprises one of:
monitoring for a condition in which the output voltage falls below a setpoint voltage of the system twice during a current period pulse of the power converter; and
monitoring for a condition in which the output voltage falls below a setpoint voltage of the system for a predetermined duration of time during a current period pulse of the power converter; and
in response to detecting the occurrence of the load transient, transition from the low-power mode to the high-power mode via a transition mode to minimize undershoot and overshoot of the output voltage.

2. The system of claim 1, wherein monitoring for the condition in which the output voltage falls below a setpoint voltage of the system for the predetermined duration of time during a current period pulse of the power converter comprises measuring the predetermined time duration using a first clock having lower fidelity than a second clock that is disabled during the low-power mode and enabled during the high-power mode until occurrence of one or more of the following events:
detecting the occurrence of the load transient; and
completion of the transition mode and beginning of operation in the high-power mode.

3. The system of claim 1, wherein:
the system further comprises a comparator configured to compare the output voltage to a setpoint voltage of the system, such that the comparator trips when the output voltage is smaller than the setpoint voltage and untrips when the output voltage is larger than the setpoint voltage; and
the controller is further configured to, during the transition mode:
control switching of power switches of the power converter based on an output of the comparator; and
switch to the high-power mode if the comparator remains tripped for a predetermined amount of time or predetermined number of switching cycles of the power converter.

4. The system of claim 1, wherein:
the system further comprises a comparator configured to compare the output voltage to a setpoint voltage of the system, such that the comparator trips when the output voltage is smaller than the setpoint voltage and untrips when the output voltage is larger than the setpoint voltage; and
the controller is further configured to, during the transition mode, control a peak current through a power inductor of the power converter based on one or more of:
a duration of time between trips of the comparator;
a duration of time the comparator is tripped;
a duration of time the comparator is untripped;
a difference between the output voltage and the setpoint voltage; and
a fixed predetermined value for the peak current.

5. The system of claim 1, wherein:
the system further comprises a comparator configured to compare the output voltage to a setpoint voltage of the system, such that the comparator trips when the output voltage is smaller than the setpoint voltage and untrips when the output voltage is larger than the setpoint voltage; and
the controller is further configured to:
during the transition mode, control a peak current through a power inductor of the power converter based on a fixed value for a fixed number of cycles until a maximum current limit is reached; and
after the maximum current limit is reached, decrease the peak current to a second lower limit and switch to the high-power mode.

6. The system of claim 1, wherein the controller causes the power converter to operate in a discontinuous conduction mode in the low-power mode and a continuous conduction mode in the high-power mode.

7. The system of claim 1, wherein the controller causes the power converter to operate in a pulse-frequency modulation mode in the low-power mode and a pulse-width modulation mode in the high-power mode.

8. A method comprising, in a system having a power converter for regulating an output voltage at an output of the power converter and power management circuitry configured to enable operation of the power converter, including one or more first components critical to operation of the power converter in a high-power mode and one or more second components critical to operation of the power converter in both the high-power mode and a low-power mode in which the system consumes significantly less power than that of the high-power mode:
causing the system to operate in one of the low-power mode and the high-power mode based on power demand from a load at the output of the power converter; and
when in the low-power mode:
monitoring the output of the power converter to detect an occurrence of a load transient from the load, wherein monitoring the output of the power converter comprises one of monitoring for a condition in which the output voltage falls below a setpoint voltage of the system twice during a current period pulse of the power converter; and monitoring for a condition in which the output voltage falls below a setpoint voltage of the system for a predetermined duration of time during a current period pulse of the power converter; and in response to detecting the occurrence of the load transient, transitioning from the low-power mode to the high-power mode via a transition mode to minimize undershoot and overshoot of the output voltage.

9. The method of claim 8, wherein monitoring for the condition in which the output voltage falls below a setpoint voltage of the system for the predetermined duration of time during a current period pulse of the power converter comprises measuring the predetermined time duration using a first clock having lower fidelity than a second clock that is disabled during the low-power mode and enabled during the high-power mode until occurrence of one or more of the following events:

detecting the occurrence of the load transient; and completion of the transition mode and beginning of operation in the high-power mode.

10. The method of claim 8, wherein:

the system further comprises a comparator configured to compare the output voltage to a setpoint voltage of the system, such that the comparator trips when the output voltage is smaller than the setpoint voltage and untrips when the output voltage is larger than the setpoint voltage; and the method further comprises, during the transition mode:

controlling switching of power switches of the power converter based on an output of the comparator; and switching to the high-power mode if the comparator remains tripped for a predetermined amount of time or predetermined number of switching cycles of the power converter.

11. The method of claim 8, wherein:

the system further comprises a comparator configured to compare the output voltage to a setpoint voltage of the system, such that the comparator trips when the output voltage is smaller than the setpoint voltage and untrips when the output voltage is larger than the setpoint voltage; and the method further comprises, during the transition mode, controlling a peak current through a power inductor of the power converter based on one or more of:

a duration of time between trips of the comparator;

a duration of time the comparator is tripped;

a duration of time the comparator is untripped;

a difference between the output voltage and the setpoint voltage; and a fixed predetermined value for the peak current.

12. The method of claim 8, wherein:

the system further comprises a comparator configured to compare the output voltage to a setpoint voltage of the system, such that the comparator trips when the output voltage is smaller than the setpoint voltage and untrips when the output voltage is larger than the setpoint voltage; and the method further comprises:

during the transition mode, controlling a peak current through a power inductor of the power converter based on a fixed value for a fixed number of cycles until a maximum current limit is reached; and after the maximum current limit is reached, decreasing the peak current to a second lower limit and switch to the high-power mode.

13. The method of claim 8, further comprising causing the power converter to operate in a discontinuous conduction mode in the low-power mode and a continuous conduction mode in the high-power mode.

14. The method of claim 8, further comprising causing the power converter to operate in a pulse-frequency modulation mode in the low-power mode and a pulse-width modulation mode in the high-power mode.

* * * * *